(12) United States Patent
Linossier

(10) Patent No.: US 10,634,933 B2
(45) Date of Patent: Apr. 28, 2020

(54) GLASSES FRAME COMPRISING AT LEAST ONE FUNCTIONAL MEMBER

(71) Applicants: Pierre-Franck Linossier, Le Puy en Velay (FR); Richard Chene, Neuilly (FR); Dominique Delamour, Les Mesnuls (FR); Alain Miklitarian, Paris (FR)

(72) Inventor: Pierre-Franck Linossier, Le Puy en Velay (FR)

(73) Assignees: Richard Chene, Neuilly (FR); Dominique Delamour, Les Mesnuls (FR); Alain Miklitarian, Paris (FR); Pierre-Franck Linossier, Le Puy en Velay (FR)

( * ) Notice: Subject to any disclaimer, the term of this patent is extended or adjusted under 35 U.S.C. 154(b) by 93 days.

(21) Appl. No.: 15/578,964

(22) PCT Filed: May 31, 2016

(86) PCT No.: PCT/EP2016/062221
§ 371 (c)(1),
(2) Date: Dec. 1, 2017

(87) PCT Pub. No.: WO2016/193239
PCT Pub. Date: Dec. 8, 2016

(65) Prior Publication Data
US 2018/0136485 A1 May 17, 2018

(30) Foreign Application Priority Data
Jun. 3, 2015 (FR) ...................... 15 55059

(51) Int. Cl.
*G02C 1/08* (2006.01)
*G02C 5/14* (2006.01)
(Continued)

(52) U.S. Cl.
CPC ............... *G02C 5/146* (2013.01); *G02C 1/10* (2013.01); *G02C 5/10* (2013.01); *G02C 5/12* (2013.01);
(Continued)

(58) Field of Classification Search
CPC ... G02C 1/04; G02C 1/08; G02C 1/06; G02C 1/10
(Continued)

(56) References Cited

U.S. PATENT DOCUMENTS

| | | | | |
|---|---|---|---|---|
| 1,659,165 A | * | 2/1928 | Sangren | G02C 1/10 2/442 |
| 4,196,982 A | * | 4/1980 | Watkins | G02C 1/06 2/443 |
| 2011/0222018 A1 | | 9/2011 | Chang | |

FOREIGN PATENT DOCUMENTS

| | | |
|---|---|---|
| FR | 2842307 A1 | 1/2004 |
| JP | 2010-134196 A | 6/2010 |

(Continued)

OTHER PUBLICATIONS

International Search Report on corresponding PCT application (PCT/EP2016/062221) from International Searching Authority (EPO) dated Aug. 22, 2016.

*Primary Examiner* — Hung X Dang
(74) *Attorney, Agent, or Firm* — Klein, O'Neill & Singh, LLP

(57) ABSTRACT

The invention relates to a glasses frame having a main frame provided with two openings for respectively receiving two lenses, at least one opening having an inner peripheral edge for cooperating with an outer peripheral edge of a lens, the glasses frame having at least one functional member. According to the invention, the peripheral inner edge of said opening of said frame has at least one recess in which said functional member is mounted, said functional member (Continued)

being designed so as to be locked in position by said lens when it is mounted in said opening.

10 Claims, 3 Drawing Sheets

(51) Int. Cl.
*G02C 5/12* (2006.01)
*G02C 1/00* (2006.01)
*G02C 5/10* (2006.01)
*G02C 13/00* (2006.01)
*G02C 5/22* (2006.01)

(52) U.S. Cl.
CPC .............. *G02C 13/001* (2013.01); *G02C 5/22* (2013.01); *G02C 2200/06* (2013.01); *G02C 2200/08* (2013.01)

(58) Field of Classification Search
USPC .................. 351/86, 83, 106, 103, 92, 90
See application file for complete search history.

(56) References Cited

FOREIGN PATENT DOCUMENTS

| | | | |
|---|---|---|---|
| KR | 200431589 | Y1 | 11/2006 |
| KR | 2013-0057644 | A | 6/2013 |

\* cited by examiner

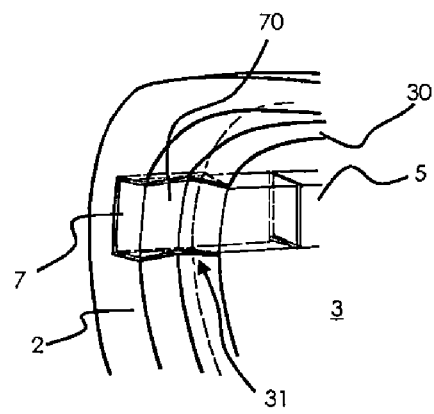
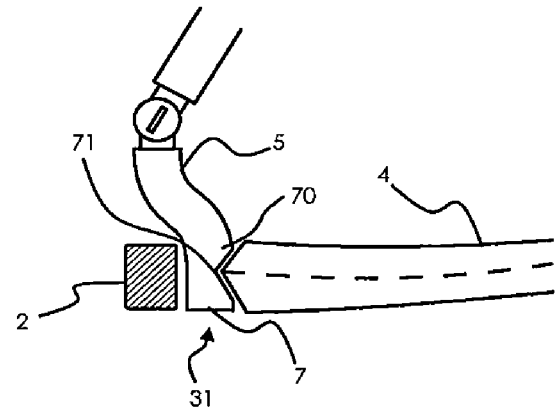
FIGURE 4
FIGURE 5A
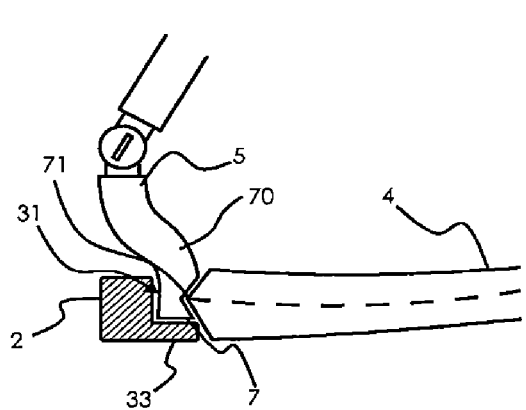
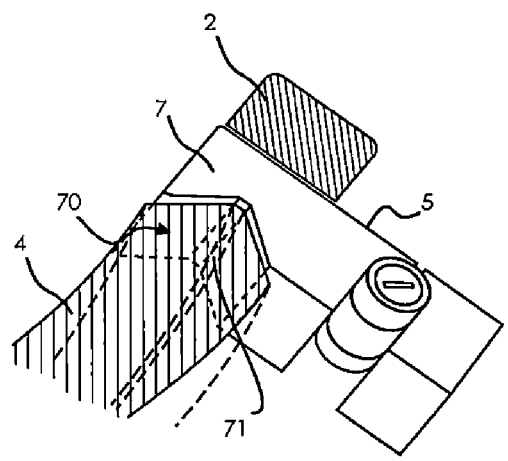
FIGURE 5B
FIGURE 6

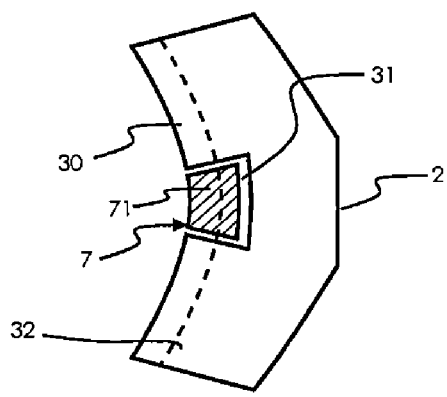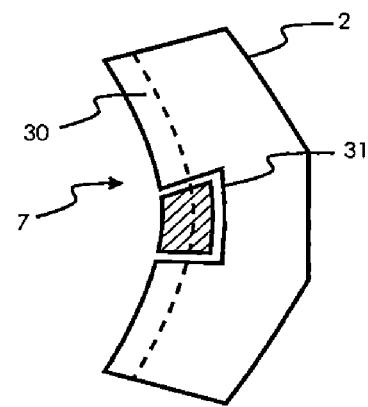
FIGURE 7
FIGURE 8
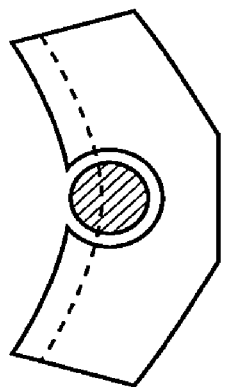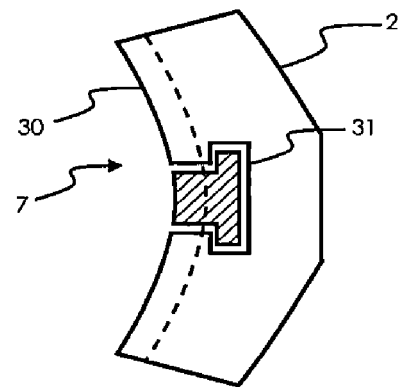
FIGURE 9
FIGURE 10

GLASSES FRAME COMPRISING AT LEAST ONE FUNCTIONAL MEMBER

TECHNICAL FIELD

This invention relates to the field of glasses frames and, more particularly, the so-called "rimmed" frames that surround the peripheral edge of the lenses.

BACKGROUND

Conventionally, a pair of glasses is formed of a glasses frame wherein solar, eyesight or fashion lenses are mounted. The glasses frame comprises a main frame suitable for receiving said lenses, and two side arms mounted at the lateral ends of said main frame. Each side arm is connected to the main frame by the intermediary of a hinge which primarily makes it possible to fold/unfold the side arm. Furthermore, the main frame comprises a nasal bridge whereon are mounted nose pads suitable for improving the comfort of the user when wearing the frame. In practice, the nasal bridge is formed from the same material as the main frame, in particular from acetate, while the nose pads are made from another material and fixed by gluing according to various methods that are more or less long and constraining.

In light of the substantial number of its components, a glasses frame is long and complex to assemble by a manufacturer or by an optician, which increases the cost of it. In addition, a glasses frame being a fashion accessory, it is necessary to design a large number of models of frames in order to satisfy all of the desires of the users, which has another disadvantage.

The invention therefore has for purpose to overcome at least some of these disadvantages by proposing a new frame of which the assembly is easy and of which the appearance can be adapted in a practical manner while still having a reduced cost of manufacturing.

SUMMARY

The invention relates to a glasses frame comprising a main frame comprising two openings able to receive respectively two lenses, at least one opening comprising an inner peripheral edge for cooperating with an outer peripheral edge of a lens, with the glasses frame comprising at least one functional member.

The frame is remarkable in that the inner peripheral edge of said opening comprises at least one recess wherein said functional member is mounted, said functional member being designed so as to be locked in position by said lens during the mounting of the lens in said opening.

The term functional member means any member that can be connected to said main frame so as to fulfil a function, in particular, a side arm, a nose pad support, an additional face for the main frame, a shimming pastille, etc.

As such, a single mounting step is sufficient in order to lock the lens and the functional member or members into position, which makes it possible to substantially limit the mounting time of a frame. In addition, the functional member is mounted naturally without using an added fastening part. Advantageously, the main frame fulfils a "tool-holder" function and makes it possible to easily connect a large number and a large variety of functional members.

Preferably, said functional member is removably mounted in said recess. It is possible to change the aesthetic appearance and the ergonomics (sizes and shapes of the functional members) of a glasses frame over time. Furthermore, the mounting of the functional member is fast and does not require a gluing/welding step.

Advantageously, the use of a functional member of the shimming pastille type makes it possible to adjust the mounting clearance when the opening of the main frame is too large in relation to the dimensions of the lens. Using a thicker functional member modifies the peripheral edge of the lens and allows for mounting. In prior art, it would have been necessary to re-manufacture a lens with the suitable dimensions, which had an additional cost.

Preferably, said functional member comprising a fastening portion configured to be mounted in said recess, the fastening portion comprises a closing face suitable for providing the continuity of the peripheral edge of the opening when the fastening portion is mounted in its recess.

Thanks to the closing face, the opening of the frame is similar to that of a conventional frame when the fastening portion is mounted in its recess. An optician can as such mount the lens conventionally, which is advantageous.

Preferably, said inner peripheral edge of the opening comprising a main groove, the closing face comprises an auxiliary groove. As such, the lens is securely maintained in a peripheral groove.

Preferably, the grooves are aligned in order to form a continuous global groove similar to a mounting groove of a frame according to prior art.

Preferably, the fastening portion of the functional member and said recess have complementary shapes in order to limit the clearance and facilitate mounting.

Preferably, the fastening portion has a circular or dovetail section but it goes without saying that other section shapes could be suitable.

According to an aspect of the invention, the inner peripheral edge of the opening comprises at least two recesses wherein two functional members are respectively mounted, more preferably, a pad member and a side arm member. Preferably, the inner peripheral edge of the opening comprises only two recesses.

According to an aspect of the invention, each opening comprises an inner peripheral edge comprising at least one recess wherein a functional member is mounted. As such, all of the openings of the frame can be provided with a functional member.

The main frame comprises a rear face configured to be turned towards the user and a front face opposite the rear face. Preferably, said functional member is suitable for being mounted in the recess from the rear to the front. As such, a simple translation makes it possible to mount a functional member. The complementarity of the shapes of the fastening portion of the functional member and of said recess make it possible to maintain the functional member stable in its recess prior to the locking thereof by the lens.

According to an aspect of the invention, said recess can be passed through from the front to the rear. As such, the functional member can be seen on the front face of the frame, which can contribute in improving the aesthetic appearance.

According to another aspect of the invention, said recess comprises a front stop wall suitable for blocking said functional member. As such, the fastening portion of the functional member is concealed by the stop wall, only the frame can be seen on the front face. Such a stop wall is advantageous in limiting the translation of the functional member during the mounting thereof in the recess.

Preferably, said functional member comprises a stop portion suitable for abutting with the main frame during the mounting of said functional member. Such a stop portion is advantageous in limiting the translation of the functional member when the recess can be passed through.

According to an aspect, said functional member is a side arm member. As such, the side arm can be mounted in the main frame such as a modular component, which makes it possible to freely choose its shape, colour and size.

According to another aspect, said functional member is a nose pad support member. As such, the pad support can be mounted to the main frame as a modular component, which makes it possible to freely choose its shape, colour and size. Advantageously, it is no longer necessary to attach the nose pads via welding as in prior art, which has a substantial savings in time.

The invention further relates to a pair of glasses comprising a frame such as shown hereinabove and at least one lens mounted in said opening and locking said functional member in position.

The invention also relates to a method for mounting at least one lens in a frame such as shown hereinabove, with the method comprising:

a step of inserting the functional member in said recess of the inner peripheral edge of said opening; and a step of mounting a lens in said opening so as to lock said functional member in position.

Thanks to the invention, a single step of mounting is sufficient to lock the lens and the functional member or members in position (side arm, nose pad support, etc.), which makes it possible to substantially limit the mounting time of a frame

BRIEF DESCRIPTION OF THE DRAWINGS

The invention shall be understood better when reading the following description, given solely by way of example, and in reference to the annexed drawings wherein:

FIG. 4 is a close-up view of a side arm member;

FIGS. 5A-5B are cross-section views of the mounting of the side arm support member in a main frame;

FIG. 6 diagrammatically shows a fastening portion of a side arm member;

FIG. 7 diagrammatically shows a first mounting shape of a functional member in a main frame recess;

FIG. 8 diagrammatically shows a second mounting shape of a functional member in a main frame recess;

FIG. 9 diagrammatically shows a third mounting shape of a functional member in a main frame recess; and FIG. 10 diagrammatically shows a fourth mounting shape of a functional member in a main frame recess.

Note that the figures disclose the invention in a detailed way in order to implement the invention, said figures can of course be used to define the invention better where applicable.

DETAILED DESCRIPTION

Figure 1:
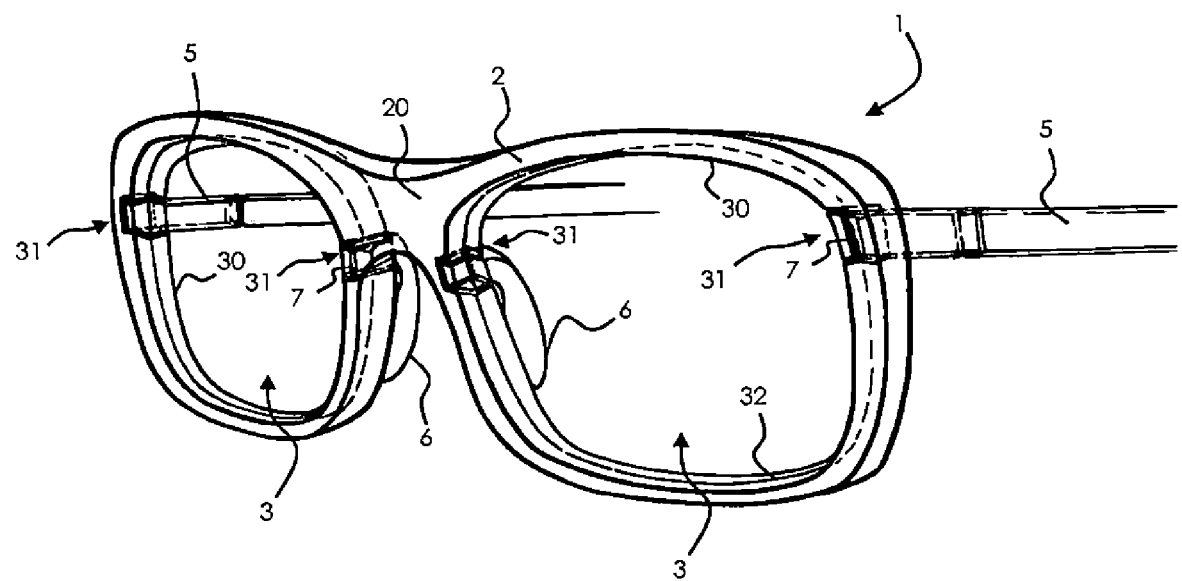
FIG. 1 diagrammatically represents a glasses frame according to the invention.

In reference to FIG. 1, a rimmed frame 1 is shown comprising a main frame 2 comprising two recesses 3 able to respectively receive lenses 4. In this example, each opening 3 comprises an inner peripheral edge 30 able to cooperate with an outer peripheral edge of a lens 4. Such an opening is also known to those skilled in the art under the name of hooping.

Still in reference to FIG. 1, the frame 1 comprises two side arm members 5 and two nose pad support members 6 which are designated, in what follows, as functional members. With a concern for concision, the nose pad support members 6 are designated in what follows as "pad members 6".

In this embodiment, the inner peripheral edge 30 of each opening 3 comprises two recesses 31 wherein two functional members are mounted, in particular, a side arm member 5 and a pad member 6. The functional members 5, 6 are configured to be locked in position during the mounting of a lens 4 in its opening 3 such as will be shown in what follows.

In this example, the functional members 5, 6 are movably mounted so as to be able to be replaced in a simple and practical manner in order to change the frame over time. However, it goes without saying that the functional members 5, 6 could be mounted in a definitive way, for example, through the use of adhesive, with the mounting of the glass 4 making it possible to secure the mounting.

Thanks to the invention, the frame 1 has a modular structure that comprises several independent components (main frame 2, side arm members 5, pad members 6, etc.). Also, if there is a collection of main frames 2, a collection of side arm members 5 and of pad members 6, it is possible to assemble a frame 1 with an original aesthetic appearance by combining several components of said collections.

Furthermore, the assembly of the frame 1 is very simple to be carried out given that the mounting of the lenses 4 makes it possible to lock the functional members 5, 6 at the same time. Advantageously, the mounting of the lenses 4 is similar to prior art and can therefore be carried out in a quick and practical manner by opticians.

The various components of the glasses frame 1 shall now be shown in detail.

In this example, still in reference to FIG. 1, the main frame 2 comprises two openings 3 suitable for receiving lenses 4. The main frame 2 is in this example made of acetate but it goes without saying that other materials could be suitable, in particular, any metal or plastic material. As shown in FIG. 1, the main frame 2 is substantially flat but it goes without saying that it could be different, in particular, curved.

In a known manner, the main frame 2 comprises a rear face configured to be turned towards the user and a front face opposite the rear face. The terms "rear" and "front" shall be used in what follows in accordance with this definition.

Each opening 3 comprises an inner peripheral edge 30 able to cooperate with an outer peripheral edge of a lens 4. In this example, still in reference to FIG. 1, the inner peripheral edge 30 comprises a main groove 32 so as to make it possible to lock a lens 4 in a stable manner in the frame 1. Preferably, the main groove 32 has a section that has the shape of a V in order to facilitate the mounting of the lens 4. However, it goes without saying that the section of the groove 32 could have a different shape.

As indicated hereinabove, each inner peripheral edge 30 comprises two recesses 31 wherein two functional members 5, 6 are mounted. In other words, the recesses 31 form discontinuities in the inner peripheral edge 30. This results in that the groove 32 of the inner peripheral edge 30 also comprises discontinuities. Advantageously, when the functional members 5, 6 are introduced into the recesses 31, the peripheral edge 30 is again continuous as shall be shown in what follows.

In this example, each opening 3 comprises a recess 31 at its lateral outer end for the mounting of a side arm member 5 and a recess 31 at its lateral inner end for the mounting of a pad member 6 such as shown in FIG. 1.

It goes without saying that the recesses 31 can be placed at other locations of the peripheral edge of the opening in such a way as to form original frames.

In this example, in reference to FIGS. 2 to 5A-5B, each recess 31 is open from the rear in such a way as to allow the mounting of a functional member 5, 6 in a recess 31 by translation from the rear to the front. Such a mounting is simple to carry out in a reduced time. In particular, as shown in FIGS. 3A and 5A each recess 31 can be passed through from the front to the rear. As such, when a functional member 5, 6 is mounted in a recess 31, the latter can be seen on the front face of the main frame 2 as shown in FIG. 1. In other words, the functional members 5, 6 can participate in improving the visual aspect of a frame 1.

Figure 3A:
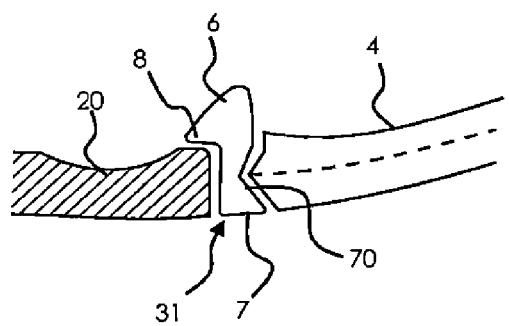
FIGS. 3A-3B are cross-section views of the mounting of the nose pad support member in a main frame.
Figure 3B:
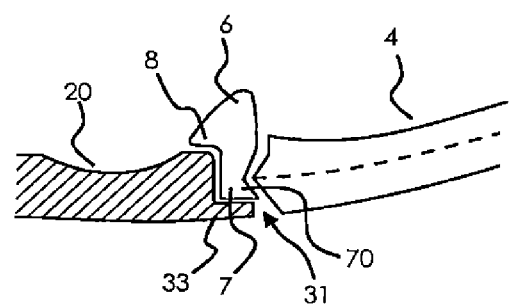

According to another embodiment, as shown in FIGS. 3B and 5B, a recess 31 can comprise a front stop wall 33 suitable for blocking said functional member 5, 6 during its translation towards the front. Such a stop wall 33 further makes it possible to conceal the functional member 5, 6 when it is located in its recess 31. In other words, when a functional member 5, 6 is mounted in a recess 31 comprising a stop wall 33, the latter cannot be seen on the front face of the main frame 2 of the frame 1.

Any type of lens 4 can be used in said frame 1. In particular, a corrective, tinted or fashion lens or a contact lens. Each lens 4 has an outer peripheral edge, preferably bevelled such as shown in FIGS. 3A-3B and 5A-5B in order to cooperate with the groove 32 of the openings 3 of the frame 1.

In this example, each functional member 5, 6 comprises a fastening portion 7 configured to be housed in a recess 31. As shown in FIGS. 2 to 5A-5B, the fastening portion 7 of a functional member 5, 6 has a shape that is complementary to the recess 31 wherein it is mounted in order to facilitate the insertion thereof and allow for a precise mounting, i.e., devoid of any functional clearance that can generate vibrations. Preferably, a mortise and tenon joint between the functional member 5, 6 and the recess 31 is particularly suitable and simple to implement.

As shown in FIGS. 7 to 10, the fastening portion 7 of a functional member 5, 6 can have a tenon-mortise (FIG. 7), a half tenon-mortise (FIG. 8), a dovetail (FIG. 9) or a T shape (FIG. 10). However, it goes without saying that other shapes could be suitable.

Preferably, in reference to FIGS. 2 to 6, the fastening portion 7 comprises a closing face 70 suitable for providing the continuity of the peripheral edge 30 of the opening 3 when the fastening portion 7 is mounted in its recess 31. The closing face 70 is preferably curved in order to hug the shape of the outer peripheral edge of the lens 4.

Furthermore, preferably, as shown in FIG. 6, the closing face 70 comprises an auxiliary groove 71 in order to cooperate with the outer peripheral edge of the lens 4. Preferably, the auxiliary groove 71 of the closing face 70 extends in the extension of the main groove 32 of the inner peripheral edge 30 of the opening 3 so as to form a global peripheral groove wherein the lens 4 can be mounted as shown in FIG. 7.

Preferably, in reference to FIGS. 3A-3B, each functional member 5, 6 comprises an abutment portion 8 adapted to abut against the rear face of the main frame 2 so as to limit the displacement of the fastening portion 7 during its translation towards the front in the recess 31.

Figure 2:
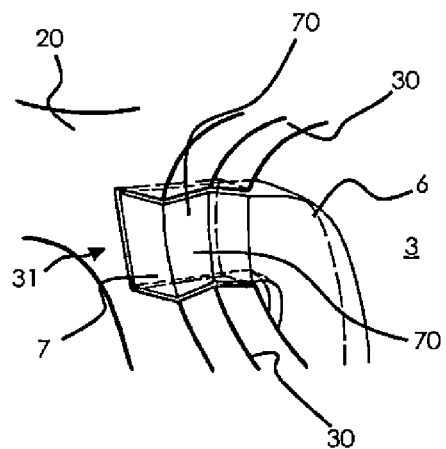
FIG. 2 is a close-up view of a nose pad support member.

As shown in FIGS. 2 and 3A-3B, the pad members 6 each comprise a fastening portion 7. Said fastening portions 7 are respectively introduced into the recesses 31 located at the lateral inside ends of the openings 3. Each pad member 6 further comprises a nose pad. Similarly, in reference to FIGS. 4 and 5A-5B, the side arm members 5 each comprise a fastening portion 7. Said fastening portions 7 are respectively introduced in the recesses 31 located at the lateral outer ends of the openings 3. Each side arm member 5 further comprises a hinge in such a way as to allow for the folding of the side arm. Advantageously, thanks to the invention, the main frame 2 does not necessarily have to have a support tenon of the side arms as in prior art, which limits the cost of manufacturing.

Preferably, it is possible to have a collection of side arm members 5 and of pad members 6 of different shapes, sizes and appearances in order to adapt to the morphology and to the aesthetical preferences of each user.

Functional members have been shown that have the form of a side arm member 5 and of a pad member 6 but it goes without saying that the functional members could be of different natures. By way of example, a functional member could have the form of a support element adapted to connect auxiliary components on the front face of the main frame 2, for example, conventional or special solar filters, professional filters or for specific leisure activities, a camera of reduced size, a microphone, means of lighting (LED, etc.), nose or temple protection from the sun (glasses for glacier skiing). In other words, in the way of a tool holder, the support element makes it possible to connect various auxiliary components, more preferably, removably. To this effect, the additional element comprises a front portion comprising means of fastening extending on the front face of the main frame 2 and a rear portion, forming the fastening portion, which is blocked between the lens 4 and the peripheral edge 30 of the opening 3. The means for fastening the support element can be mechanical but also magnetic.

A functional member can also have the form of a shimming pastille adapted to take up a clearance that is excessive between a lens 4 and the opening 3 configured to receive the lens 4. Indeed, when the opening 3 machined in the main frame 2 is larger than the lens 4 that it is to receive, it is sufficient to use a shimming pastille between the edge of the opening 3 and the lens 4 to take up all of the mounting clearance and allow for optimum mounting. It is as such no longer required to carry out a new lens 4 suitable for the dimensions of the opening 3.

A method for mounting lenses 4 in the glasses frame 1 shall now be shown.

In this embodiment, an optician first selects the components of the frame 1 that are to be assembled, i.e., the main frame 2, the side arm members 5 and the pad members 6. It goes without saying that the side arm members 5 or the pad members 6 of the same frame 1 can be identical or different. Advantageously, flat nose pads, used in the case of acute myopia, can be integrated into any type of main frame 2.

Then, the optician inserts each functional member 5, 6 in the recesses 31 of the openings 3. To this effect, the fastening portions 7 of the side arm members 5 are translated from the rear to the front in the recesses 31 located at the lateral outer ends of the openings 3 of the main frame 2. In mounted position, the closing face 70 of the fastening portion 7 extends in the continuity of the inner peripheral edge 30 of the opening 3 wherein it is mounted as shown in FIGS. 4 and 5A-5B. The pad members 6 are mounted in a similar way in the recesses 31 located at the lateral inside ends of the openings 3.

Once the functional members 5, 6 are mounted, the inner peripheral edge 30 of each opening 3 is continuous. In this example, it further comprises a global peripheral groove which is formed in part in the main frame 2 and in part on the closing faces 70 of the functional members 5, 6.

The optician then performs a step of mounting a lens 4 in the opening 30 so as to lock said functional members 5, 6 mounted in said opening 30. The mounting of the lens 4 is carried out in a manner similar to prior art, which is practical. The second lens 4 is mounted in the frame in a similar way.

Thanks to the invention, a customised pair of glasses can be mounted quickly and in a practical manner by an optician. The cost price of a frame is limited while still optimising the possibilities for customisation.

The invention was shown for a main frame comprising openings with a peripheral edge formed in the main frame but the invention also applies to a main frame referred to as "half-moon" wherein the opening is formed in part by a taught cable, in particular, made of nylon.

The invention claimed is:

1. A glasses frame comprising:
    a main frame comprising:
        a rear face configured to be turned towards the user;
        a front face opposite the rear face; and
        two openings able to respectively receive two lenses, wherein at least one opening comprises an inner peripheral edge able to cooperate with an outer peripheral edge of a lens;
    a nose pad support member; and
    a frame;
        wherein said inner peripheral edge of said at least one opening comprises at least one recess wherein is mounted said nose pad support member;
        wherein said nose pad support member is designed to be locked in position by said lens during mounting of the lens in said at least one opening;
        wherein said nose pad support member is adapted to be mounted in said at least one recess from a rear to a front; and
        wherein said at least one recess comprises a front stop wall suitable for blocking said nose pad support member.

2. The glasses frame according to claim 1, wherein, said nose pad support member comprises a fastening portion configured to be mounted in said at least one recess, wherein said fastening portion comprises a closing face adapted to provide continuity of the peripheral edge of the opening when the fastening portion is mounted in its recess.

3. The glasses frame according to claim 2, wherein said inner peripheral edge of said at least one opening comprises a main groove, and wherein the closing face comprises an auxiliary groove.

4. The glasses frame according to claim 1, wherein, said nose pad support member comprises a fastening portion configured to be mounted in said recess, wherein the fastening portion of said nose pad support member and said at least one recess have complementary shapes.

5. The glasses frame according to claim 1, wherein each of the two openings comprise an inner peripheral edge comprising at least one recess wherein is mounted a nose pad support member.

6. The glasses frame according to claim 1, wherein said rear face of said main frame is configured to be turned towards a wearer, wherein said at least one recess can be passed through from the front to the rear.

7. The glasses frame according to claim 1, wherein said nose pad support member comprises an abutment portion adapted to abut against said main frame during mounting of said nose pad support member.

8. The glasses frame according to claim 1, wherein said nose pad support member is removably mounted in said at least one recess.

9. A pair of glasses comprising a frame according to claim 1 and at least one lens mounted in said opening and locking said nose pad support member in position.

10. A method for mounting at least one lens in a glasses frame according to claim 1, with the method comprising:
    a step of inserting the nose pad support member in said recess of the inner peripheral edge of said opening; and
    a step of mounting a lens in said opening in order to lock said nose pad support member in position.

* * * * *